United States Patent
Freund et al.

(10) Patent No.: US 6,778,309 B2
(45) Date of Patent: Aug. 17, 2004

(54) ELECTROABSORPTION MODULATOR WITH TUNABLE CHIRP

(75) Inventors: Joseph Michael Freund, Fogelsville, PA (US); Thomas Gordon Beck Mason, Bethlehem, PA (US); Joseph Patrick Reynolds, Macungie, PA (US); Robert Ehrler Tench, Allentown, PA (US); Frank Stephen Walters, Kutztown, PA (US)

(73) Assignee: Triquint Technology Holding Co., Hillsboro, OR (US)

( * ) Notice: Subject to any disclaimer, the term of this patent is extended or adjusted under 35 U.S.C. 154(b) by 0 days.

(21) Appl. No.: 10/226,184

(22) Filed: Aug. 22, 2002

(65) Prior Publication Data

US 2004/0036943 A1 Feb. 26, 2004

(51) Int. Cl.[7] .............................. G02F 1/03; G02F 1/07
(52) U.S. Cl. ...................... 359/259; 359/264; 359/252
(58) Field of Search .................................. 359/332–334, 359/345, 237–264; 385/2, 3, 8, 13, 124–126; 257/431–436

(56) References Cited

U.S. PATENT DOCUMENTS

| | | | |
|---|---|---|---|
| 5,621,560 A | 4/1997 | Wood | 348/183 |
| 6,222,966 B1 * | 4/2001 | Khan et al. | 385/45 |
| 6,233,082 B1 | 5/2001 | Johnson | 359/237 |
| 2001/0053165 A1 * | 12/2001 | Wang et al. | 372/38.02 |
| 2003/0025976 A1 * | 2/2003 | Wipiejewski | 359/240 |
| 2003/0095737 A1 * | 5/2003 | Welch et al. | 385/14 |

* cited by examiner

Primary Examiner—Jordan M. Schwartz
Assistant Examiner—Jessica Stultz

(57) ABSTRACT

An electroabsorption modulator comprises a tandem arrangement of a conventional electroabsorption (EA) modulator element and a phase modulator element. The EA modulator element is driven by the digital data signal and the phase modulator is driven by a chirp tuning control signal, such as the complement of the data signal. By controlling the amplitude and/or bias of the chirp tuning control signal, the frequency chirp of the intensity-modulated output signal from the EA modulator element can be controlled.

9 Claims, 5 Drawing Sheets

ELECTROABSORPTION MODULATOR WITH TUNABLE CHIRP

TECHNICAL FIELD

The present invention relates to electroabsorption (EA) modulators and, more particularly, to a tandem EA modulator structure where one modulator is used as a phase modulator and the other is used as an amplitude/intensity modulator to provide for tunable chirp at the tandem modulator output.

BACKGROUND OF THE INVENTION

For short distance or low bit rate optical communication systems, a directly modulated laser can be used as a transmitter. However, this technique has many limitations that preclude its use for longer distances or higher bit rate applications. In particular, a directly modulated laser is limited in terms of its bandwidth, large frequency chirp and low extinction ratio (difference between a logic "1" and logic "0"). These fundamental limitations have been the driving force behind developing "external" optical intensity modulators for the transmitter laser sources. Optical intensity modulators can be categorized into two main types based on the physical phenomenon that they use to modulate the light. One category contains modulators that rely on the electro-optic effect to change the effective index of a waveguide and modulate the phase of an optical signal. This type of modulator typically employs a Mach-Zehnder interferometer geometry to a convert the phase change into an intensity modulation. The other category of modulators is based on the electroabsorption (EA) effect, which changes the absorption in an optical waveguide to modulate the intensity of a lightwave passing through the modulator. There are a number of advantages and distinctions associated with each of these categories of modulators, but in general they both offer substantial benefits over direct modulation. Among the benefits are low or negative chirp, high extinction ratio and bandwidths that are wide enough to support ever-increasing high data rates.

In particular, EA modulators employ the quantum confined Stark effect (QCSE) to change the absorption in a semiconductor optical waveguide, where this change then modulates the intensity of the light transmitted through the device. This change in the absorption properties also produces, however, an undesirable change in the index of refraction along the waveguide, leading to a shift in the frequency of the optical wave propagating through the device (referred to as "frequency chirp"). As is well known in the art, uncontrolled frequency chirping can result in degradation of the transmission performance for fiber optic-based communication systems. That is, for a device exhibiting negative chirp (a downward shift in frequency), the maximum transmission distance in single mode fiber will be substantially reduced. However, for a device exhibiting optimized "positive" chirp, the transmission distance can actually be increased. In conventional EA modulators, a positive chirp can only be realized over a narrow wavelength range. Even in this mode, the device must be biased to the point where it exhibits a large insertion loss.

Thus, a need remains in the art for an EA modulator that exhibits an improved chirp characteristic over the prior art and, preferably, exhibits a tunable (both positive and negative) frequency chirp over a relatively wide wavelength range.

SUMMARY OF THE INVENTION

The need remaining in the prior art is addressed by the present invention, which relates to electroabsorption (EA) modulators and, more particularly, to a tandem EA modulator structure.

In accordance with the present invention, a tandem EA modulator comprises a first modulator element that functions as a phase modulator, and a second modulator element that functions as a conventional (amplitude/intensity) EA modulator. The conventional EA modulator element is driven by the usual "data" signal and a "chirp tuning signal" is used as the drive signal input to the phase modulator element of the tandem arrangement. In its simplest form, the complement of the data signal can be used as the chirp tuning signal. Alternatively, a sinusoidal signal that is synchronous with the data signal can be used as the input for the phase modulator element, or a sinusoidal, synchronous complement of the data signal may be used. In any version, the phase changing output of the phase modulator component is used to compensate for the inherent chirp of the conventional EA modulator by modifyng either the amplitude or the bias point for the phase modulator drive signal thus enabling the chirp of the signal exiting the EA modulator to be tuned from negative to positive across a relatively wide wavelength range.

In one embodiment, the phase modulator and intensity modulator are formed along the same optical waveguide as a monolithic device. In an alternative arrangement, a different quantum well structure, with a higher band gap energy, is used for the phase modulator element of the tandem structure.

The tunable chirp tandem EA modulator of the present invention can be used as an external modulator with a laser gain section, or with a semiconductor amplifier as part of a larger integrated optical arrangement. Indeed, various other optical components can be used in association with the tunable chirp tandem EA modulator and, in fact, the modulator sections may be separately disposed as input and output devices in association with various optical devices (e.g., the phase modulator element disposed at the input of a semiconductor optical amplifier and the intensity modulator element disposed at the output of the same semiconductor optical amplifier).

Other and further embodiments and aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
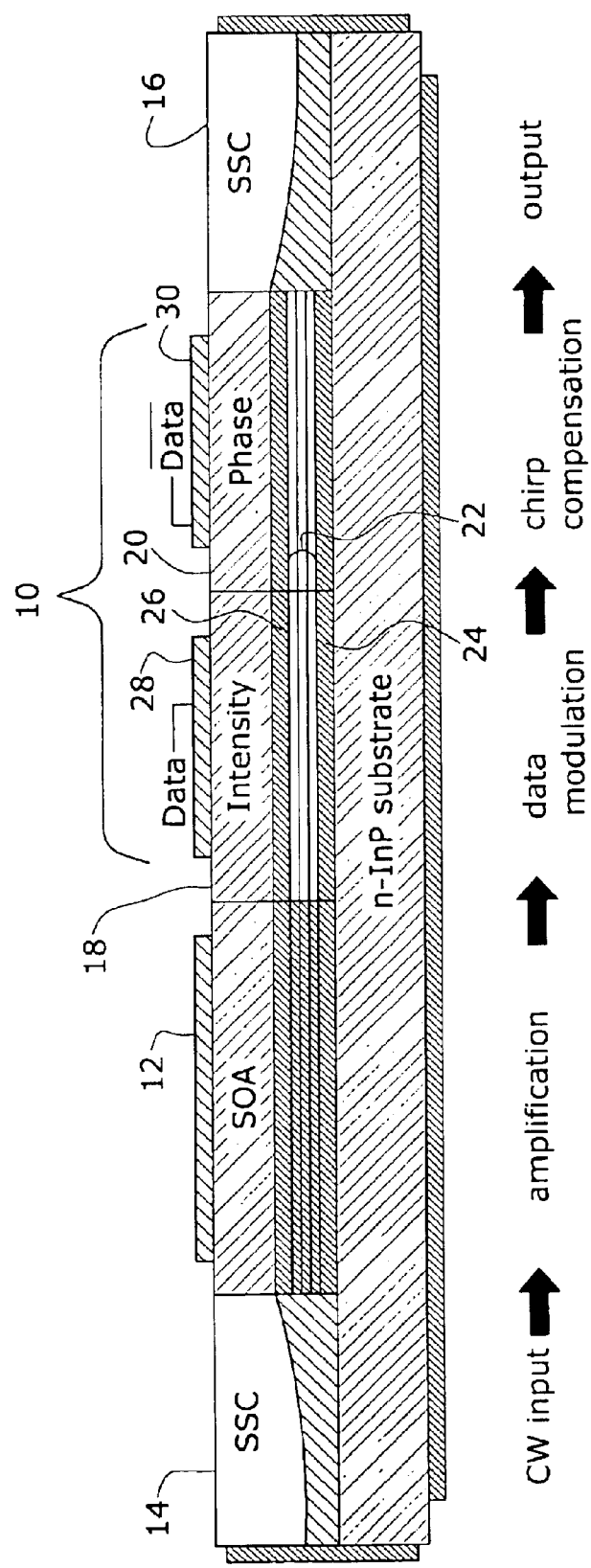
FIG. 1 is a side view depiction of the tunable chirp tandem EA modulator of the present invention in a monolithic arrangement.

FIG. 1 illustrates an exemplary tunable chirp EA modulator 10 of the present invention, which in this example is incorporated with a semiconductor optical amplifier 12 and a pair of spot size converters 14 and 16. In accordance with the present invention, tunable chirp EA modulator 10 includes a conventional (intensity) EA modulator element 18 and a phase modulator element 20. The design of an EA modulator involves a large number of optical and electrical considerations. In its simplest form, an EA modulator consists of a semiconductor optical waveguide within a P-I-N diode structure. The optical waveguide is formed by sandwiching a higher index of refraction (lower bandgap) core layer between two lower index of refraction (higher bandgap) cladding layers. In the particular embodiment as illustrated in FIG. 1, EA modulator component 18 and phase modulator component 20 are formed as a single structure, sharing the same quantum well core layer 22 and InP-based cladding layers 24 and 26.

In accordance with this embodiment present invention, EA modulator portion 18 is driven (at electrode 28) with an input electrical "data" signal, and phase modulator portion 20 is driven (at electrode 30) with the complement of the same data signal as the "chirp tuning signal". To overcome insertion loss associated with EA modulator 10, semiconductor optical amplifier 12 is used. Spot size converters 14 and 16 are used to reduce coupling loss into and out of the device. While the amplifier and converters may be included in a preferred embodiment, it is to be understood that they are not required in the implementation of the tandem EA modulator arrangement of the present invention. Indeed, a variety of different embodiments of the tandem EA modulator arrangement are considered to fall within the scope of the present invention and will be briefly discussed after describing the basic operation of the inventive modulator.

Referring to FIG. 1, a CW optical input signal is coupled into first spot size converter 14, then amplified within semiconductor optical amplifier 12 before entering EA modulator element 18. At this point, the electrical data signal applied by electrode 28 of EA modulator element 18 will cause changes in the electroabsorption properties of EA modulator element 18 and provide intensity modulation to the CW input lightwave signal. As discussed, phase modulator element 20 of EA modulator 10 is driven by, in this particular example, the complement of the data signal, so as to apply phase modulation to the intensity-modulated output from EA modulator component 18 and compensate for the frequency chirp present in the intensity modulated signal. By controlling the bias point and/or amplitude of the "data complement" signal, the amount of chirp in the final output signal can be controlled (i.e., "tuned").

Figure 2:
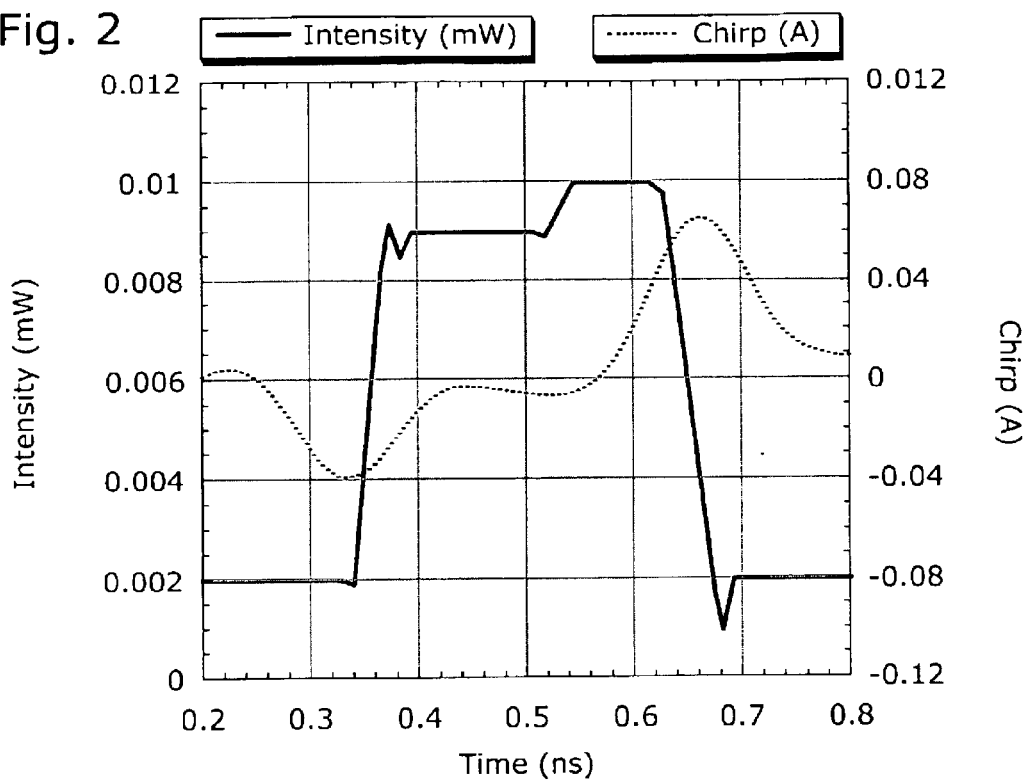
FIG. 2 is a graph illustrating both the modulation intensity and chirp associated with the EA modulator portion of the tandem arrangement, as driven by an incoming data signal.
Figure 3:
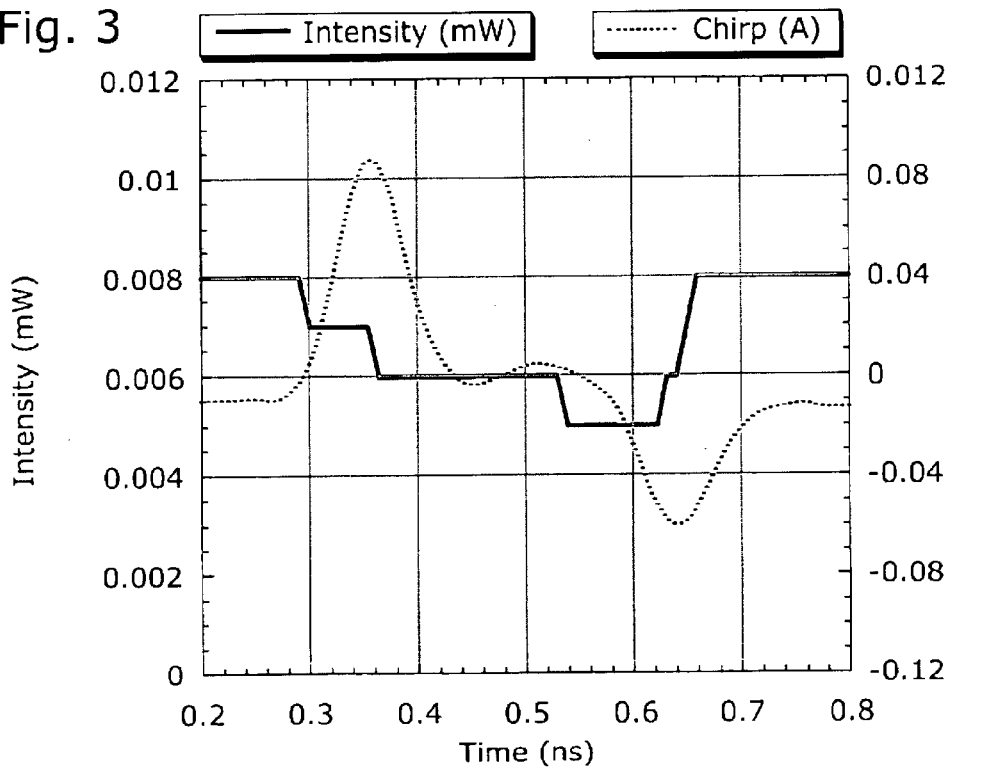
FIG. 3 is a graph illustrating both the modulation intensity and chirp associated with the phase modulator portion of the tandem arrangement, using the complement of the incoming data signal as the chirp tuning signal.
Figure 4:
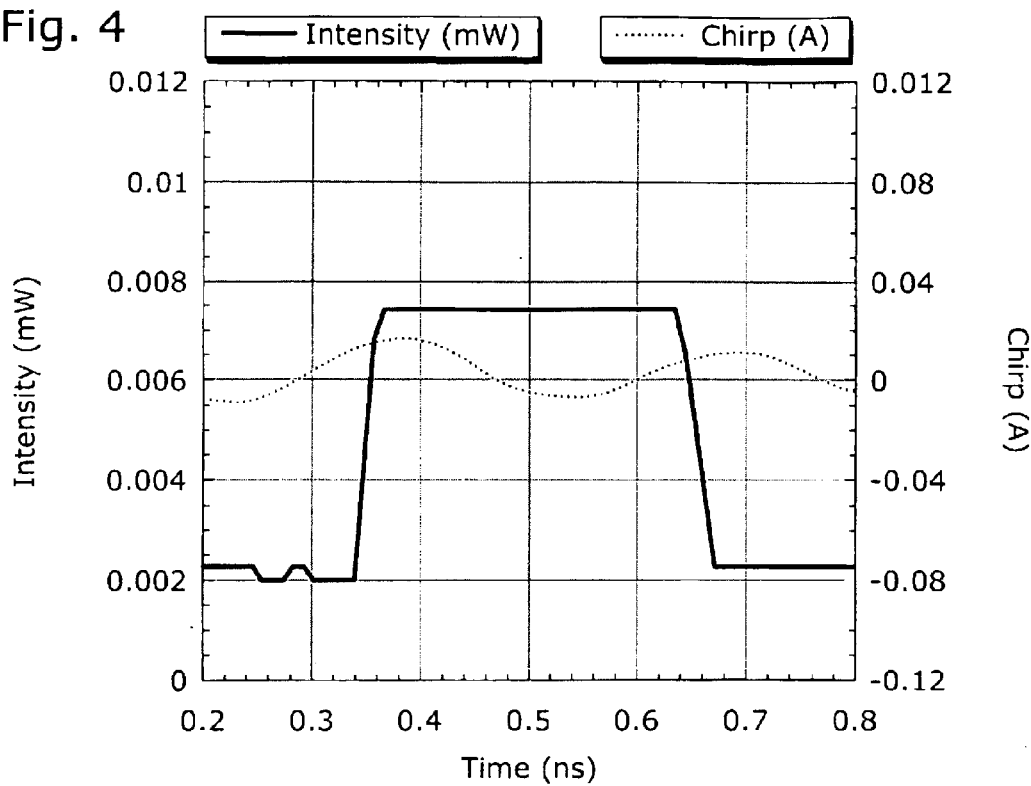
FIG. 4 is a graph depicting the improvement in chirp, while maintaining an acceptable extinction ratio, when both elements in the tunable chirp tandem EA modulator are activated.

FIG. 2 is a graph of the amplitude and frequency characteristics of EA modulator 10, with a 10 GB/s data signal applied as the electrical input, and without the use of phase modulator element 20. Thus, the graph of FIG. 2 is representative of the prior art response of an exemplary EA modulator. In this example, a 3.5 V bias voltage (2.5 V p-p) is applied and EA modulator 10 exhibits a relatively good extinction ratio and low insertion loss. Evident in the phase plot, however, is the undesirable frequency chirp component. When just phase modulator element 20 is driven (with the complement of the data signal), and EA modulator element 18 is not activated, the results are as shown in FIG. 3. In this case, a complement data signal having a 1.0 V bias with 2.5 V p-p was used. This particular bias was chosen to exhibit a low extinction ratio (a small amount of opposite amplitude modulation as compared with the amplitude plot for EA modulator element 18 of FIG. 2), and a frequency component essentially opposite that of EA modulator element 18. By concatenating the two elements, in accordance with the present invention and as depicted in FIG. 1, the resultant output signal will exhibit characteristics as shown in FIG. 4, which contains plots of both amplitude and frequency of the output signal. As shown, the tandem arrangement results in a slight reduction in the extinction ratio, but provides a significant improvement in terms of reduction of the chirp present in the output signal. Therefore, by driving both components at the same time (using both the "data" and "data complement" input signals in this case) the chirp present in the EA modulator output signal can be controlled by modifying the bias and/or amplitude of the "data complement" signal applied to the phase modulator.

Figure 5A:
FIG. 5 is an eye diagram of a signal after transmission through 75 km of fiber, illustrating both a prior art arrangement (without chirp compensation) in FIG. 5A, and an arrangement of the present invention (with tunable chirp compensation) in FIG. 5B.
Figure 5B:
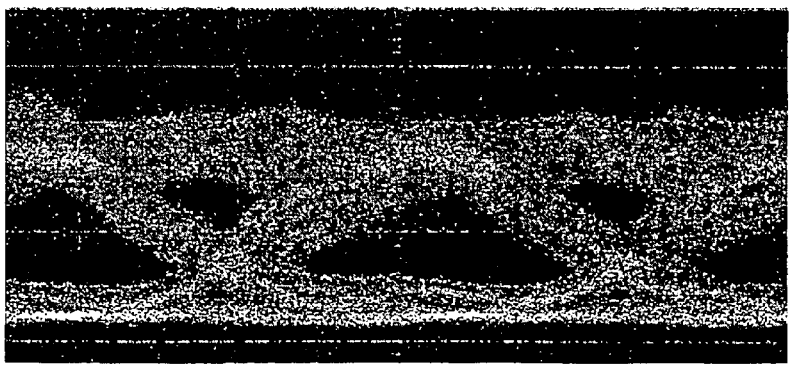

FIG. 5 contains eye diagrams of optical signals, modulated with an EA modulator, after propagating along 75 km of standard signal mode fiber at a transmission rate of 10 GB/s. The graph of FIG. 5A depicts the prior art case, where there is no compensation for the chirp associated with using an EA modulator to impress the 10 GB/s data signal onto a CW lightwave input signal. As shown, the presence of chirp results in a relatively "closed" eye. In contrast, the graph of FIG. 5B depicts the situation where a tandem EA modulator of the present invention is utilized, with the phase modulator portion using as an input the complement of the 10 GB/s input data signal. The extinction ratio in this case remains at a relatively high level of approximately 13.91 dB, with an eye opening of approximately 60 ps, significantly better than that associated with the prior art.

Figure 6:
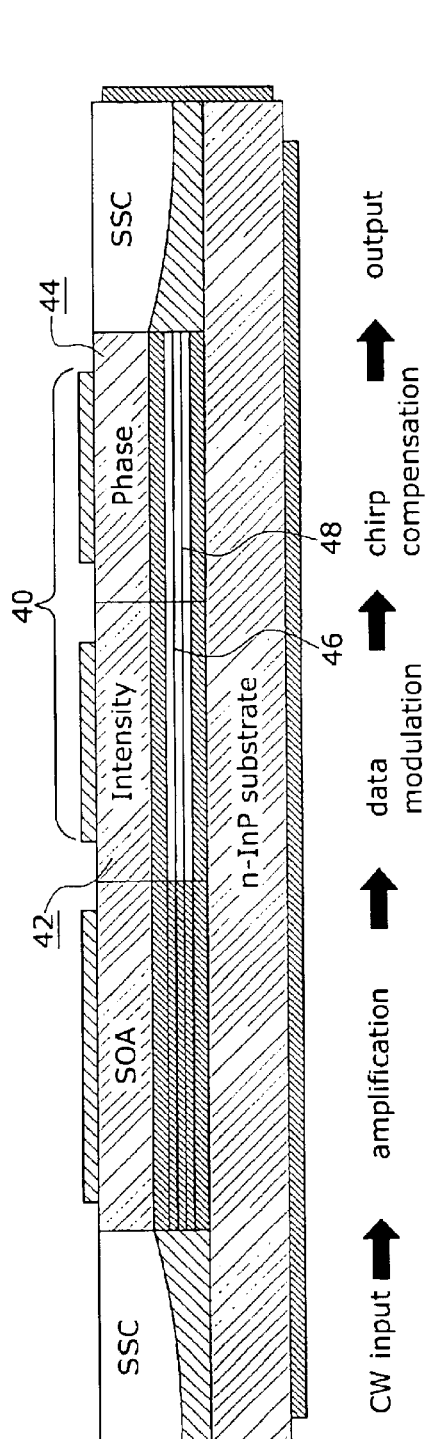
FIG. 6 illustrates an exemplary discrete version of the tunable EA modulator of the present invention, using different MQW structures for the intensity modulator component and the phase modulator component.

The arrangement as depicted in FIG. 1 utilizes the same multiple quantum well active region (region 22) for both EA modulator component 18 and phase modulator portion 20. Thus, a monolithic structure is formed that is relatively easy to manufacture and insures essentially complete coupling between elements. Alternatively, separate structures may be used to form each element, with the characteristics of each tailored to suit their individual purposes. For example, the phase modulator component may comprise a multiple quantum well active region with a higher bandgap energy, so that its phase characteristic may be adjusted by changing the materials used to form the MQS structure. In this case, by using separate structures, the phase and amplitude of the phase modulator can be adjusted without adversely affecting the output amplitude of the conventional intensity modulator. FIG. 6 illustrates one such discrete arrangement of the present invention, using separate EA modulator and phase modulator elements. As shown, a tunable chirp tandem EA modulator 40 includes an intensity modulator element 42 and a phase modulator element 44. The active MQW region 46 of intensity modulator 42 is shown as exhibiting a different structure than active MQW region 48 of phase modulator element 44. As mentioned above, active MQW region 48 of phase modulator element 44 can be formed to exhibit a higher bandgap energy, and may also comprise different materials than active MQW region 46 of intensity modulator 42.

Figure 7:
FIG. 7 is a diagram of an alternative embodiment of the present invention, using a synchronous sinusoidal chirp tuning signal input to the phase modulator element in the tandem EA modulator, where in this embodiment the phase modulator element is disposed at the input of a semiconductor optical amplifier and the intensity modulator element is disposed at the output of the semiconductor optical amplifier.
Figure 7:
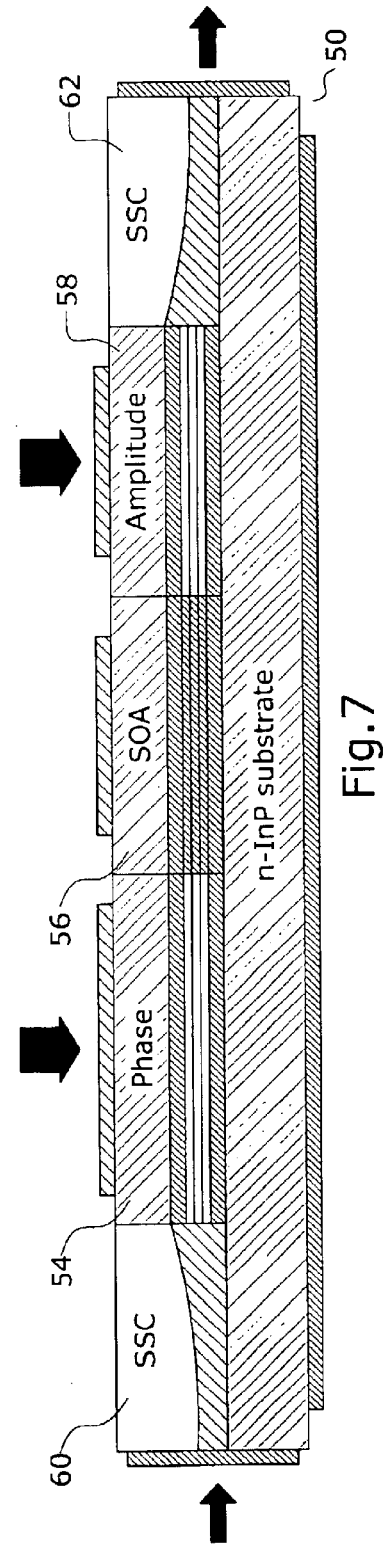

As mentioned above, there exist a variety of different arrangements and uses for the tandem tunable chirp EA modulator of the present invention. For example, such a tunable EA modulator could be used with a separate laser gain section to form an externally-modulated laser (EML) device, or used in combination with both a laser gain section and a semiconductor optical amplifier. FIG. 7 illustrates yet another arrangement, as mentioned above, where the phase modulator element of the tandem arrangement is disposed at the input to a semiconductor optical amplifier and the intensity modulator is disposed at the output. As shown, arrangement 50 illustrates an exemplary EA modulator 52 with tunable chirp including a phase modulator element 54 disposed at the input of a semiconductor optical amplifier 56 and a conventional intensity modulator 58 a coupled to the output of semiconductor optical amplifier 56. An input spot size converter 60 and output spot size converter 62 are also included in arrangement 50. In this particular embodiment of the present invention, a sinusoidal phase modulation signal is used as the "chirp tuning signal" input to phase modulator element 54. The sinusoidal signal is selected to have a sine wave that approximates a data pulse of the same period as the data signal input applied to intensity modulator 58. That is, for a 10 Gb/s data signal, a 10 GHz sine wave is used as the sinusoidal input for the phase modulator, where the phase modulator input is controlled to be synchronous with the data signal. As with the arrangement described above using the complement of the data signal as the chirp tuning signal, the amount and sign of chirp present in the output signal is controlled by modifying the phase and/or bias of the phase modulator drive signal (i.e., the sinusoidal modulation signal).

Figure 8:
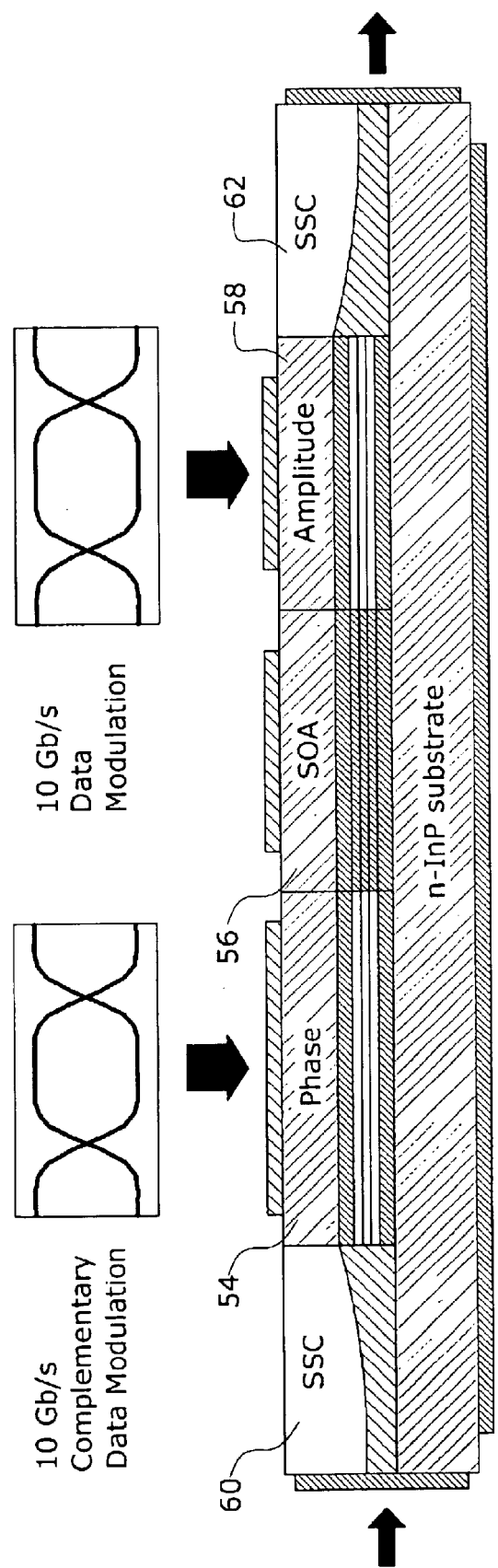
FIG. 8 is a diagram of another embodiment of the present invention, similar to the arrangement of FIG. 7, but using a complementary synchronous sinusoidal signal as the phase modulator input signal.

FIG. 8 illustrates yet another embodiment of the present invention, using the same arrangement as discussed above in association with FIG. 7, but using a different chirp tuning signal. In this case, a complementary data phase modulation signal is used, which has been found to provide more effective chirp cancellation than the synchronous sinusoidal phase modulation signal, since the complement will naturally track the value changes in the applied input data signal.

While various embodiments of the present invention of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An electroabsorption optical modulator for providing intensity-based modulation to an input CW optical signal, said modulator comprising an electroabsorption modulator element including an active light guiding core region surrounded by a cladding region, said modulator further including an electrode disposed over said cladding region and responsive to an electrical digital data signal, wherein the presence of the electrical digital data signal modifies the index of refraction within said active core region so as to provide intensity modulation to an input CW optical signal propagating through said core region, the intensity-modulated output signal from said electroabsorption modulator element exhibiting a degree of frequency chirp associated with the intensity modulation process; and a phase modulator element disposed contiguous with said electroabsorption modulator element, said phase modulator including an active light guiding core region surrounded by a cladding region, said phase modulator further including an electrode disposed over, said cladding region and responsive to a chirp tuning input drive signal comprising the complement of the electrical digital data signal, wherein the amplitude or the phase of the chirp tuning input drive signal, or both are modified to control the amount of frequency chirp present in the output signal from the electroabsorption modulator element.

2. An electroabsorption optical modulator as defined in claim 1 wherein the electroabsorption modulator element and the phase modulator element are formed on a common substrate and share the same active light guiding core region and cladding region, using separate electrodes to define the electroabsorption modulator element and the phase modulator element.

3. An electroabsorption modulator as defined in claim 1 wherein the electroabsorption modulator element comprises a multiple quantum well active region.

4. An electroabsorption modulator as defined in claim 1 wherein the phase modulator element comprises a multiple quantum well active region.

5. An electroabsorption modulator as defined in claim 1 wherein both the electroabsorption modulator element and the phase modulator element comprise a multiple quantum well active region.

6. An electroabsorption optical modulator as defined in claim 1 wherein the electroabsorption modulator element and the phase modulator element are formed as separate elements and comprise different active light guiding core region and cladding regions.

7. An optical transmission arrangement comprising a semiconductor optical amplifier; and an electroabsorption optical modulator coupled to said semiconductor optical amplifier for providing intensity-based modulation to an input CW optical signal, said modulator comprising an electroabsorption modulator element including an active light guiding core region surrounded by a cladding region, said modulator further including an electrode disposed over said cladding region and responsive to an electrical digital data signal, wherein the presence of the electrical digital data signal modifies the index of refraction within said active core region so as to provide intensity modulation to an input CW optical signal propagating through said core region, the intensity-modulated output signal from said electroabsorption modulator element exhibiting a degree of frequency chirp associated with the intensity modulation process; and a phase modulator element disposed contiguous with said electroabsorption modulator element, said phase modulator including an active light guiding core region surrounded by a cladding region, said phase modulator further including an electrode disposed over said cladding region and responsive to a chirp tuning input drive signal comprising the complement of the electrical digital data signal, wherein the amplitude or the phase of the chirp tuning input drive signal, or both are modified to control the amount of frequency chirp present in the output signal from the electroabsorption modulator element.

8. An optical transmission arrangement as defined in claim 7 wherein the semiconductor optical amplifier is disposed at the input of the intensity modulator element and the phase modulator element is disposed at the output of the intensity modulator element.

9. An optical transmission arrangement as defined in claim 7 wherein the phase modulator element is disposed at the input of the semiconductor optical amplifier and the intensity modulator element is disposed at the output of the semiconductor optical amplifier.

* * * * *